(12) United States Patent
Erb

(10) Patent No.: US 12,093,778 B2
(45) Date of Patent: Sep. 17, 2024

(54) SYSTEM, IN PARTICULAR AN INSTALLATION, INCLUDING A MOBILE PART THAT IS MOVABLE ALONG A CODING REGION, AND METHOD FOR OPERATING SUCH A SYSTEM

(71) Applicant: SEW-EURODRIVE GMBH & CO. KG, Bruchsal (DE)

(72) Inventor: Frank Erb, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 8 days.

(21) Appl. No.: 17/634,689

(22) PCT Filed: Jul. 15, 2020

(86) PCT No.: PCT/EP2020/025334
§ 371 (c)(1),
(2) Date: Feb. 11, 2022

(87) PCT Pub. No.: WO2021/028069
PCT Pub. Date: Feb. 18, 2021

(65) Prior Publication Data
US 2022/0327305 A1    Oct. 13, 2022

(30) Foreign Application Priority Data
Aug. 13, 2019 (DE) ............. 10 2019 005 669.8

(51) Int. Cl.
*G06K 7/14* (2006.01)
*B61L 25/02* (2006.01)

(52) U.S. Cl.
CPC .......... *G06K 7/1443* (2013.01); *B61L 25/025* (2013.01); *G06K 7/1417* (2013.01)

(58) Field of Classification Search
CPC .. G06K 7/1443; G06K 7/1417; B61L 25/025; B61L 3/065; B66C 13/18; B66F 9/0755
See application file for complete search history.

(56) References Cited

U.S. PATENT DOCUMENTS 7,817,181 B2   10/2010   Lee
9,797,754 B2   10/2017   Toraille et al.
(Continued)

FOREIGN PATENT DOCUMENTS

CN   1771734 A     5/2006
CN   201800556 U   4/2011
(Continued)

OTHER PUBLICATIONS

International Report on Patentability issued in corresponding International Application No. PCT/EP2020/025334 dated Feb. 8, 2022, pp. 1-8, English Translation.
(Continued)

*Primary Examiner* — Matthew Mikels
(74) *Attorney, Agent, or Firm* — Carter, DeLuca & Farrell LLP

(57) ABSTRACT

A system, e.g., an installation, includes a mobile part that is movable along a coding region. A camera is arranged on the mobile part and is connected to an evaluation unit of the mobile part. The coding region has coded regions arranged successively. A one-part or multi-part cover covers coded regions, and has an opening through which an image of the first coded region can be taken by the camera. The evaluation unit is adapted to temporally recurrently determined the deviation of the first coded region with respect to the viewing direction of the camera and/or to the straight line, which is aligned in parallel with the viewing direction of the camera and passes through the central point of the image (Continued)

sensor of the camera, and/or to a reference point in the coding region and immobile relative to the mobile part.

23 Claims, 1 Drawing Sheet

(56) References Cited

U.S. PATENT DOCUMENTS

| | | | |
|---|---|---|---|
| 2010/0131185 A1* | 5/2010 | Morris | G01C 15/00 701/19 |
| 2018/0174157 A1* | 6/2018 | Endress | H04L 9/3278 |
| 2018/0209823 A1 | 7/2018 | Kirsch | |

FOREIGN PATENT DOCUMENTS

| | | |
|---|---|---|
| CN | 103183043 A | 7/2013 |
| CN | 103587556 A | 2/2014 |
| CN | 103612649 A | 3/2014 |
| CN | 104608774 A | 5/2015 |
| DE | 19910933 A1 | 9/2000 |
| DE | 102004018404 A1 | 11/2005 |
| DE | 202007012798 U1 | 2/2009 |
| DE | 102017009075 A1 | 4/2018 |
| EP | 2037228 A1 | 3/2009 |
| EP | 3035002 A1 | 6/2016 |
| FR | 2279600 A | 2/1976 |
| KR | 101471846 B1 | 12/2014 |

OTHER PUBLICATIONS

International Search Report issued in corresponding International Application No. PCT/EP2020/025334 dated Nov. 9, 2020, pp. 1-2, English Translation.

* cited by examiner

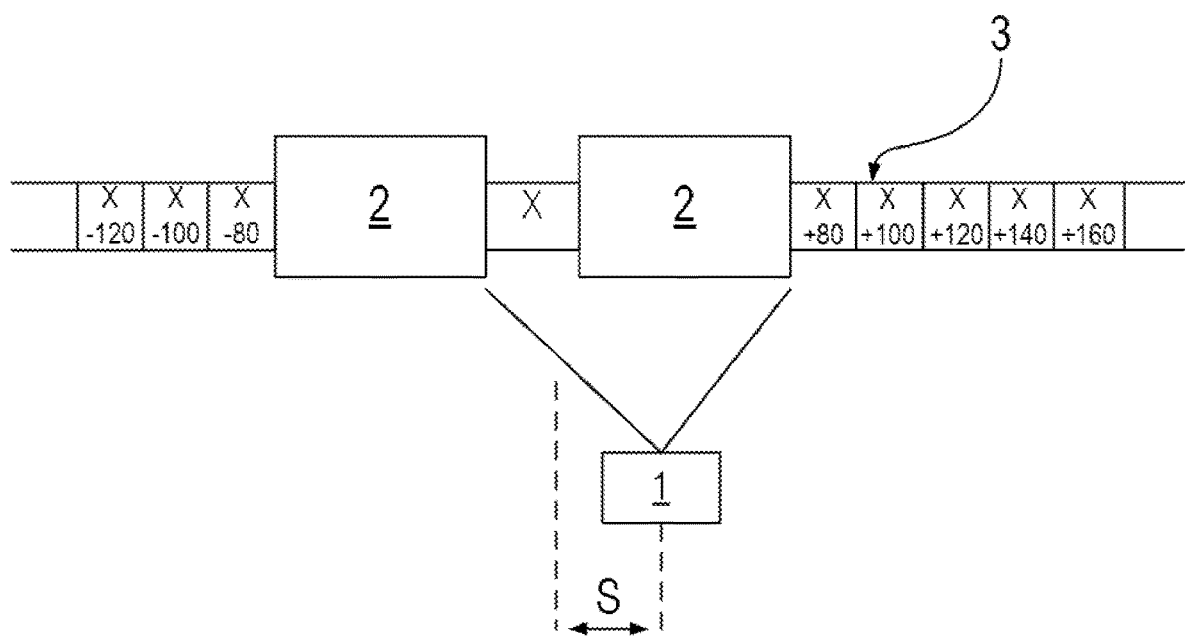

SYSTEM, IN PARTICULAR AN INSTALLATION, INCLUDING A MOBILE PART THAT IS MOVABLE ALONG A CODING REGION, AND METHOD FOR OPERATING SUCH A SYSTEM

FIELD OF THE INVENTION

The present invention relates to a system, e.g., an installation, including a mobile part that can move along a coding region, and a method for operating such a system.

BACKGROUND INFORMATION

In certain conventional systems, a mobile part arranged as a rail vehicle can be moved in the direction of the rails.

A method for determining a maintenance interval for a vehicle is described in European Patent Document No. 2 037 228.

A device for positioning a vehicle is described in German Patent Document No. 199 10 933.

An optoelectronic device is described in German Patent Document No. 10 2004 018 404.

U.S. Patent Application Publication No. 2018/0209823 describes a method for the reliable determination of the position of an object.

SUMMARY

Example embodiments of the present invention provide a system with improved reliability.

According to an example embodiment of the present invention, a system, e.g., an installation, includes a mobile part that is movable along a coding region, and a camera is arranged on the mobile part. The camera is connected to an evaluation unit, e.g., an image evaluation unit, of the mobile part. The coding region, e.g., in the direction of travel of the mobile part, includes coded regions arranged successively, e.g., uniformly and/or equally spaced apart. A one-part or multi-part cover covers coded regions, e.g., coded regions adjacent to the first coded region, e.g., covers towards the camera. The cover has an opening through which an image of the first coded region can be taken by the camera. The evaluation unit is arranged such that the evaluation unit, e.g., by evaluating an image taken of the first coded region, temporally recurrently determines the deviation, e.g., the distance, of the first coded region as relates to the viewing direction of the camera and/or to the straight line, which is aligned parallel to the viewing direction of the camera and passes through the central point of the image sensor of the camera, and/or to a reference point that is in the coding region and is immobile relative to the mobile part.

The advantage is that the coded region has its respective position in the system as information and thus the coded region can be detected by the camera, it can be recognized by the evaluation unit, and the information can be decoded. In addition, the deviation of the coded region from the center of the image can be determined for precise determination of the position of the mobile part. Since the distance between the camera of the mobile part and the coding region is always constant, e.g., because of the rail routing, the deviation in the image can be clearly assigned to a length, which ranges from the point that is located in the coding region and appears in the center of the image taken to the first coded region, the image of which is taken and recognized by the evaluation unit. By adding this length to the position of the first coded region, a very precise determination of the position of the mobile part along the railway line, e.g., the rail line, can be performed.

According to example embodiments, the evaluation unit is adapted to monitor the temporally recurrently determined deviations for impermissibly large outliers, e.g., at a constant speed of the mobile part, e.g., in that the evaluation unit, for example, based on a regression line determined from the temporally recurrently determined deviations, monitors the coefficient of determination, a residual sum of squares, or a total sum of squares for an exceeding of a threshold value. The advantage is that a test can be performed from time to time to improve the reliability of the system. The specified intervals are tested for plausibility. This is performed such that, when the mobile part passes by at constant speed, the deviation of the first coded region is determined in a temporally recurrently manner and a regression line is determined for the determined deviation values with associated points in time. Thus, the coefficient of determination, the residual sum of squares, or the total sum of squares can be determined for the determined deviation values in relation to the regression line and monitored for the exceeding of a threshold value. In this manner, it is possible to determine whether one or more outliers are in the determined deviation values or not. This increases the credibility of the deviation values determined before and after the test and thus increases the position values.

A cover is provided for the test such that only the first coded region appears in the camera image. The expected change in deviation over time can thus be monitored for outliers starting from the point of the coding region corresponding to the center of the image. If an outlier occurs, there is a defect, and an error signal can be generated.

According to example embodiments, the cover includes one part or several parts of a cover element, e.g., a sheet metal part or adhesive tape. The advantage is that a region can be made available in the system as a test region in a simple manner.

According to example embodiments, the cover covers not only the closest adjacent coded region but also the coded regions after that, e.g., without interruption, for example, in which the cover outlines the first coded region. The advantage is that the test can be performed undisturbed by the other coded regions. This prevents any error in the coded regions.

According to example embodiments, the mobile part is a rail vehicle, e.g., an overhead monorail vehicle, in which the coding surface extends parallel to the rails and the coded regions are arranged successively in the direction of the rails. The advantage is that the coding surface is arranged parallel to the rails and thus a constant distance is achieved between the camera and the coding surface in a simple manner. The deviation of the image of the first coded region is thus directly proportional to a length in the direction of the rails.

According to example embodiments, each of the coded regions has a two-dimensional code, e.g., a QR code. It is considered advantageous that the information of the position of the code can be encoded and thus the mobile part is capable of determining its position by detecting the coding region, which is arranged to be stationary.

According to example embodiments, each coded region encodes at least its position in the system. The advantage is that the position of the mobile part can at least roughly be determined by recognizing and decoding the coded region.

According to an example embodiment of the present invention, in a method of operating a system, e.g., an installation, that includes a mobile part that is movable along a coding region, in which a camera is arranged on the mobile part, the coding region, e.g., in the direction of travel of the mobile part, has coded regions which are arranged successively, e.g., uniformly and/or equally spaced apart, a one-part or multi-part cover covers coded regions, e.g., coded regions adjacent to the first coded region, e.g., covers towards the camera, the cover has an opening through which an image of the first coded region is recorded temporally recurrently by the camera; for example, the mobile part is moved at a constant speed; by evaluating the images taken of the first coded region, the respective deviations, e.g., distances, of the first coded region are determined with respect to the viewing direction of the camera and/or to the straight line, which is aligned in parallel with the viewing direction of the camera and passes through the central point of the image sensor of the camera, and/or with respect to a reference point that is in the coding region and is immobile relative to the mobile part; the determined deviations are monitored for an impermissibly large outlier; for example, in that the coefficient of determination, a residual sum of squares, or a total sum of squares is monitored for an exceeding of a threshold value, e.g., based on a regression line determined from the temporally recurrently determined deviations. The advantage is that increased reliability can be established. This is because monitoring for outliers while a test is being conducted makes it possible to check the function of the components of the evaluation unit and thus improve reliability.

According to example embodiments, there is additional monitoring to determine whether the deviations (s) are within a permissible value range. The advantage is that the reliability is further improved by such an additional test.

According to example embodiments, each coded region has its position in the system as information, each coded region has a first code encoded in a first color and a second code encoded in a second color, and the first and the second code each encode the same information. The advantage is that the position of the mobile part can be roughly determined by recognizing and decoding a coded region.

According to example embodiments, a lighting device of the mobile part with controllable color of the emitted light of the lighting device is used to recognize and decode the first code by illumination by the lighting device and to recognize and decode the second code by illumination by the lighting device, such that the respectively decoded bits of information are compared with one another and an error signal is triggered if they do not match. The advantage is that the reliability can be further improved in that the information on the actuation of the lighting device, that is to say the information on the color, and the respectively decoded information can be compared with one another, and thus further monitoring can be performed.

Further features and aspects of example embodiments of the present invention are described in more detail below with reference to the appended schematic Figures.

BRIEF DESCRIPTION OF THE DRAWING

A system according to an example embodiment of the present invention is schematically illustrated in FIG. 1.

DETAILED DESCRIPTION

As illustrated in FIG. 1, a mobile part which has a camera, e.g., with an image sensor, moves along a trajectory parallel to an elongated coding surface.

The mobile part is, for example, rail-guided, and the coding surface 3 is arranged parallel to the rails. The trajectory thus extends parallel to the rails.

The coding surface 3 is formed from uniformly and/or equally spaced apart coded regions arranged successively in the direction of the rails. Each of the coded regions has the same size, e.g., as a QR code.

A first of the coded regions is designated with X in FIG. 1. Each additional coded region shown is designated with its distance away from X, for example as "X−80," which indicates a distance of 80 millimeters between the centers of gravity of the two coded regions.

Three coded regions before and three coded regions after coded region X are covered by a cover element 2, such as a sheet metal part or adhesive tape.

The camera 1 is attached to the mobile part and has an image evaluation unit for evaluating the images recorded by the camera 1. In this case, for recognized coded region X, the deviation s, measured in the direction of the rail, of the position of X corresponds to the particular position which is the center of the image recorded by the camera.

When the mobile part passes by at a constant rail speed, s increases proportionally to the time until coded region X leaves the sensitive region and then another coded region, "X+80", is recognized, such that s falls back to a negative value, from which it then increases again.

The coded regions of the coding region 3 encode their respective position in the installation itself. The position of the mobile part can therefore be determined from the decoding of the respective coded region and the determination of the deviation s.

A position determination method is thus performed in this manner. This is because only at least one coded region in the sensitive region of the camera has to be detected and decoded and the associated deviation s in the rail direction has to be determined in order to detect the position of the mobile part along the rail route.

It is important that the camera 1 is always kept a constant distance away from the coding region 3.

In order to increase the reliability of the overall system and the position determination system present in the manner described herein, a test is performed at intervals. Performed such tests repeatedly at time intervals provides for a higher level of reliability to be achieved.

For this purpose, the mobile part is moved past the cover element 2 at a constant speed, so that the repeatedly determined values of the deviation s are determined which belong to coded region X at the respective point in time t. The tuples (s, t) determined in this manner are used to determine a regression line and to determine the mean square deviation of the value tuples from the regression line.

In each test, the mean square deviation obtained from the regression line is monitored for an impermissibly high degree of deviation from zero.

In this manner, if outliers occur, the mobile part can be switched off or stopped in a manner specific for reliability.

Further measures to improve reliability can also be performed such as monitoring the specific values of the deviation s for a permissible value range.

Specific reliability measures can also be implemented when the respective coded region is recognized. For example, the coding region is first illuminated and recognized and decoded with a lighting device of a first color and then with a lighting device of a second color. The control commands for the illumination can be used for specific reliability monitoring of the decoded information.

In further exemplary embodiments, a mean value is used instead of the mean square deviation, such as the mean value of the squares of the distances to the regression line or the square root of this mean value or mathematically similar mean values.

LIST OF REFERENCE NUMERALS

1 Camera, e.g., with an image sensor, of a mobile part
2 Cover element, e.g., a sheet metal part or adhesive tape
3 Coding region

The invention claimed is:

1. A system, comprising:
a mobile part movable along a coding region and including a camera connected to an evaluation unit of the mobile part, the coding region including successively arranged coded regions, each coded region including a code; and
a one-part or multi-part cover that covers the code of at least one of the coded regions;
wherein the evaluation unit is adapted to temporally recurrently determine a deviation of a first coded region with respect to a viewing direction of the camera and/or to a straight line aligned in parallel with the viewing direction of the camera and passing through a central point of an image sensor of the camera and/or to a reference point arranged in the coding region and movable relative to the mobile part.

2. The system according to claim 1, wherein the evaluation unit is arranged as an image evaluation unit, the coded regions are arranged successively in a direction of travel of the mobile part, the cover covers the code of coded regions adjacent to the first coded region and covers toward the camera, the evaluation unit is adapted to temporally recurrently determine the deviation by evaluating an image taken of the first coded region, and the deviation includes a distance.

3. A system, comprising:
a mobile part movable along a coding region and including a camera connected to an evaluation unit of the mobile part, the coding region including successively arranged coded regions; and
a one-part or multi-part cover that covers at least one of the coded regions;
wherein the evaluation unit is adapted to temporally recurrently determine a deviation of a first coded region with respect to a viewing direction of the camera and/or to a straight line aligned in parallel with the viewing direction of the camera and passing through a central point of an image sensor of the camera and/or to a reference point arranged in the coding region and movable relative to the mobile part; and
wherein the cover includes at least one part of a cover element and borders the first coded region, each coded region including a respective position in the system as information, each coded region having a first code encoded in a first color and a second code encoded in a second color, the first and second codes each encoding same information, the mobile part including a control device adapted to control a color of emitted light of a lighting device of the mobile part, the control device adapted to recognize and decode the first code and the second code by illumination by the lighting device, the system including a comparison device adapted to compare respectively decoded bits of information with each other and to trigger an error signal if the bits of information do not match.

4. The system according to claim 3, wherein the cover element includes a sheet metal part and/or an adhesive tape.

5. The system according to claim 1, wherein the evaluation unit is adapted to monitor the temporally recurrently determined deviations for impermissibly large outliers.

6. The system according to claim 5, wherein the evaluation unit is adapted to, based on a regression line determined from the temporally recurrently determined deviations, monitor a coefficient of determination, a residual sum of squares, or a total sum of squares for an exceeding of a threshold value.

7. The system according to claim 1, wherein the evaluation unit is adapted to monitor the temporally recurrently determined deviations for impermissibly large outliers, at a constant speed of the mobile part.

8. The system according to claim 1, wherein the cover is adapted to cover the code of a closest adjacent coded region and the subsequent coded regions.

9. The system according to claim 1, wherein the cover is adapted to cover the code of a closest adjacent coded region and subsequent coded regions without interruption.

10. The system according to claim 1, the cover borders the first coded region.

11. The system according to claim 1, wherein the mobile part is arranged as a rail vehicle and/or as an overhead monorail vehicle, the coding region extends parallel to rails, and the coded regions are arranged successively in a direction of the rails.

12. The system according to claim 1, wherein the code includes a two-dimensional code.

13. The system according to claim 12, wherein the two-dimensional code includes a QR code.

14. A method for operating a system as recited in claim 1, comprising:
temporally recurrently recording, by the camera, an image of the first coded region through an opening of the cover;
determining, by evaluating images taken of the first coded region, respective deviations of the first coded region with respect to the viewing direction of the camera and/or to the straight line aligned in parallel with the viewing direction of the camera and passes through the central point of the image sensor of the camera and/or to the reference point that is in the coding region and is immobile relative to the mobile part; and
monitoring the determined deviations for an impermissibly large outlier.

15. The method according to claim 14, wherein the temporally recurrently recording is performed during movement of the mobile part at a constant speed, the deviations include distances.

16. The method according to claim 14, wherein the monitoring includes monitoring a coefficient of determination, a residual sum of squares, or a total sum of squares for an exceeding of a threshold value.

17. The method according to claim 14, wherein the monitoring includes monitoring a coefficient of determination, a residual sum of squares, or a total sum of squares for an exceeding of a threshold value based on a regression line determined from temporally recurrently determined deviations.

18. The method according to claim 14, wherein the cover includes at least one part of a cover element, and the cover borders the first coded region.

19. The method according to claim 14, wherein the cover element includes a sheet metal part and/or an adhesive tape.

20. The method according to claim 14, further comprising determining whether the deviations are within a permissible value range.

21. A method, for operating a system that includes a mobile part movable along a coding region and including a camera connected to an evaluation unit of the mobile part, the coding region including successively arranged coded regions, each coded region including a code, and a one-part or multi-part cover that covers the code of at least one of the coded regions, the evaluation unit adapted to temporally recurrently determine a deviation of a first coded region with respect to a viewing direction of the camera and/or to a straight line aligned in parallel with the viewing direction of the camera and passing through a central point of an image sensor of the camera and/or to a reference point arranged in the coding region and movable relative to the mobile part, comprising:

temporally recurrently recording, by the camera, an image of the first coded region through an opening of the cover;

determining, by evaluating images taken of the first coded region, respective deviations of the first coded region with respect to the viewing direction of the camera and/or to the straight line aligned in parallel with the viewing direction of the camera and passes through the central point of the image sensor of the camera and/or to the reference point that is in the coding region and is immobile relative to the mobile part; and monitoring the determined deviations for an impermissibly large outlier;

wherein each coded region includes a respective position in the system as information, each coded region has a first code encoded in a first color and a second code encoded in a second color, and the first and the second code each encode same information.

22. The method according to claim 21, further comprising using a lighting device of the mobile part with a controllable color of emitted light of the lighting device to recognize and decode the first code and the second code by illumination by the lighting device.

23. The method according to claim 22, further comprising:

comparing respectively decoded bits of information with each other; and triggering an error signal if the compared bits do not match.

* * * * *